Aug. 14, 1928.  1,680,639

F. H. RUEHMEIER

METER FOR TAXICABS

Filed March 2, 1927    2 Sheets-Sheet 1

Aug. 14, 1928.

F. H. RUEHMEIER

METER FOR TAXICABS

Filed March 2, 1927    2 Sheets-Sheet 2

1,680,639

Inventor
Frank H. Ruehmeier
By Arthur H. Ewald,
Attorney

Patented Aug. 14, 1928.

1,680,639

UNITED STATES PATENT OFFICE.

FRANK H. RUEHMEIER, OF LATONIA, KENTUCKY.

METER FOR TAXICABS.

Application filed March 2, 1927. Serial No. 172,132.

My invention relates to meters for computing the fare to be paid by taxicab passengers. Taxicab meters as at present generally in use usually have a movable flag or other insignia which is used to indicate the occupancy or vacancy of the vehicle, and when in position to indicate occupancy to cause the meter to register the mileage upon which the fare is to be based.

The principal object of the present invention is to provide in connection with a taxicab meter of the kind mentioned, means whereby the operator is prevented from operating the cab when the cab is occupied by one or more passengers without lowering the flag which causes the meter to register, thus obviating the possibility of a dishonest operator, operating the vehicle with passengers in such manner as to prevent the registration thereof on the meter.

Figure 3:
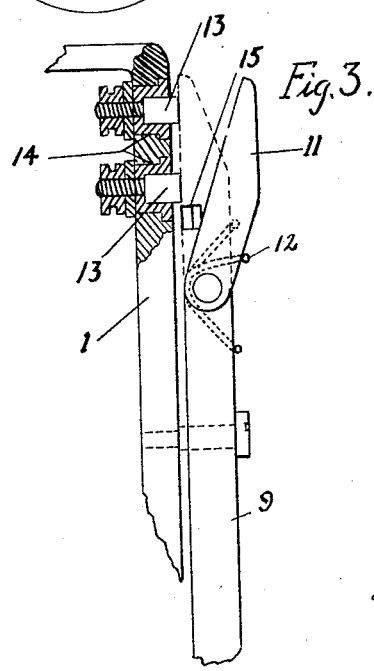
Figure 3 is an elevation of the contact mechanism.

The numeral 1 indicates a casing which is arranged to be secured to the usual taxicab meter, or where the device is originally built into the meter, may comprise a portion of the meter casing itself. The numeral 2 indicates the usual flag or other mechanism, the raised or lowered position of which indicates whether the meter will register or not, the flag 2 being lowered when the vehicle is occupied and raised when it is vacant. The shaft 3 upon which the flag 2 is rigidly mounted is provided with a pinion 4 fixedly mounted thereon. Mounted in the casing 1 is a gear 5 which intermeshes with the pinion 4. Gear 5 intermeshes with the pinion 6 also mounted in the casing 1. Slidably mounted in the bracket bearing 7 in the casing 1 is a rack bar 8. Slidably mounted in suitable bearings in the housing is a rod 9, the upper end of which is provided with a transverse pin 10 upon which a metal contact finger 11 is pivotally mounted. A spring 12 tends normally to force the contact finger 11 forward so as to make contacts with contact points 13—13 mounted in the casing 1 and insulated therefrom by means of insulating bushings etc. 14, as shown in Figure 3. Tapered end 15 of the rack bar 8 is adapted to slide under the contact finger 11 to force the same away from the contacts 13 as hereinafter set forth. Mounted in the casing is the usual taxicab short circuiting switch 16 having the contacts 17—17 which are arranged to be short circuited by a spring 18 for stopping the motor. The contacts 13—13 and 17—17 are connected in parallel by conductors 19 and 20, and the contacts 13 are connected by leads 21 and 22 with the magneto, providing the ignition circuit. Leads 23 and 24 connect the contacts 17—17 with the motor distributor.

The lower end of the rod 9 is provided with a rack 25 which intermeshes with a pinion 26 mounted in the body of the vehicle, either under the seat or in other protected place. The pinion 26 is of greater length than the thickness of the rack 25 and intermeshes also with a rack 27 on a horizontal rod 28 mounted in bearings 29 under the floor of the vehicle. The rear end of the rod 28 is provided with a rack 30 which intermeshes with a part of a pinion 31, said pinion also intermeshing with a rack 32 of a vertical rod 33 mounted under the seat 34 of the cab. The upper end of the rod 33 is pivotally connected at 35 with a frame 36 mounted in the cushion of the seat 34, the rear portion of said frame being pivoted as shown at 37 on a bracket 38 in the rear of the seat. The frame 36 is normally kept in raised position by means of cushion springs 39.

It will be understood that the rods 9, 28 and 33 and other mechanisms are so mounted in the body and framework of the car as to be inaccessible, thus preventing access thereto for operation in other than the desired manner.

Figure 1:
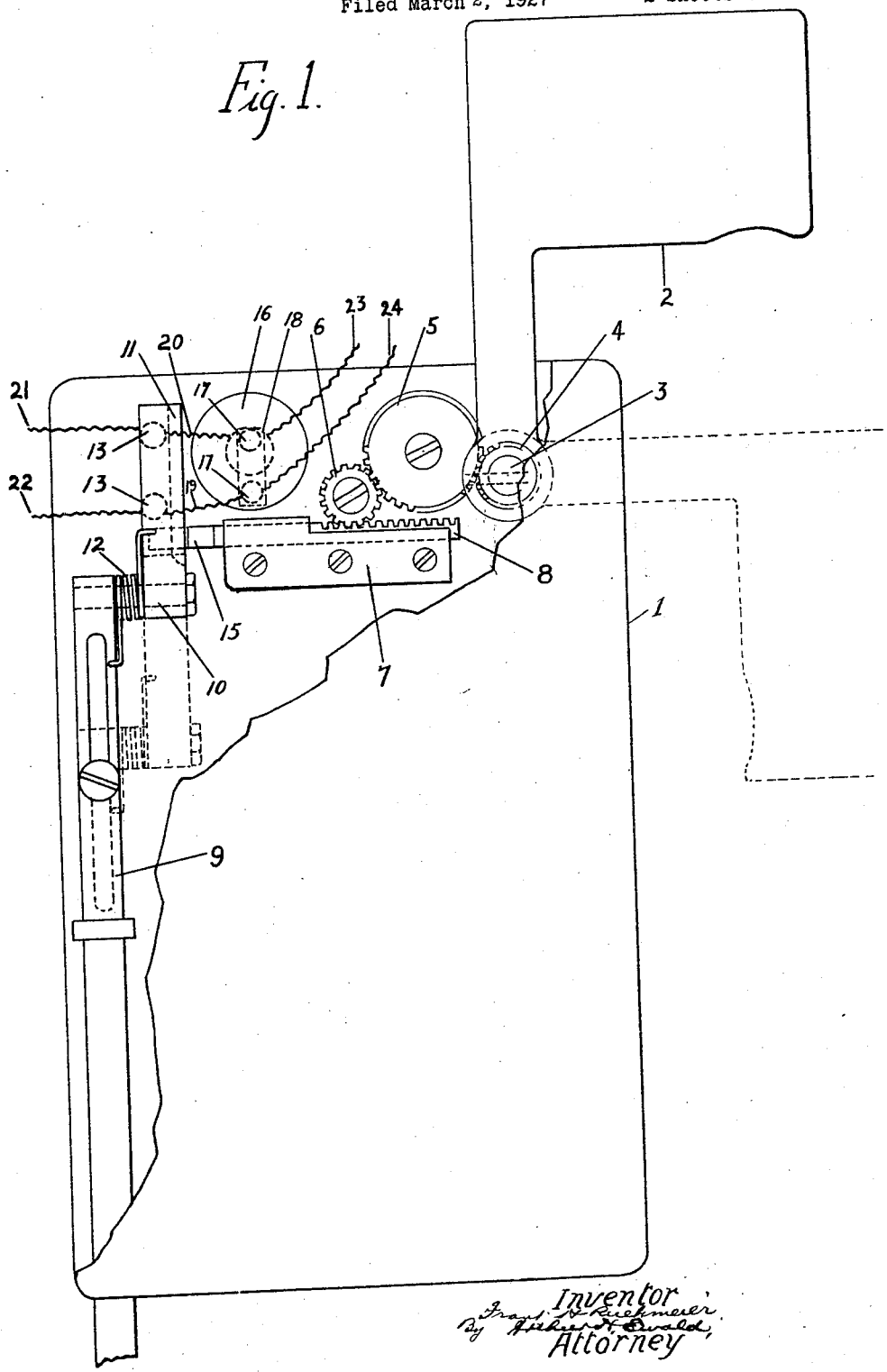
Figure 1 is an elevation of a portion of a fare meter constructed in accordance with this invention, a portion of the casing being broken away to disclose the operating parts.
Figure 2:
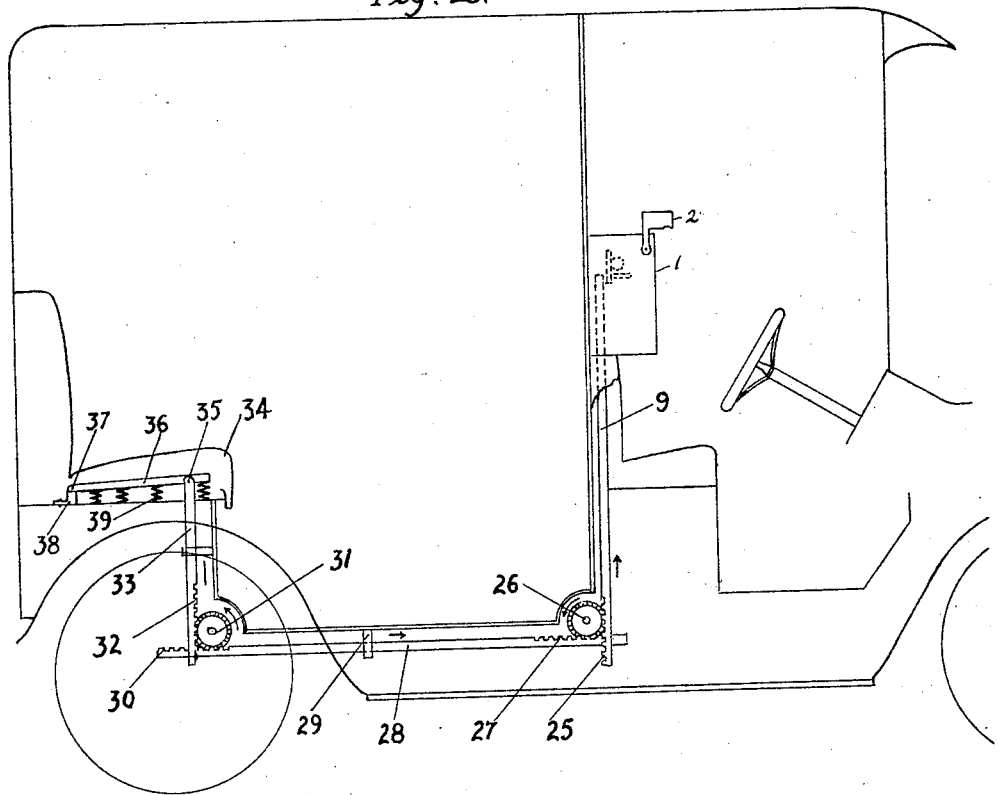
Figure 2 is a view of the device for operating the protective mechanisms.

The operation of the device is as follows: When the taxicab is without a passenger, the frame 36 is raised by the springs 39, thus operating the rods 33, 28 and 9 so as to lower the contact finger 11 to the position shown in broken lines in Figure 1, in which position it is below one or both of the contacts 13—13 so that it cannot electrically connect the same. When, however, a passenger enters the vehicle and occupies the seat 34 his weight depresses the frame 36 and raises the rod 9 through the intermediation of the rods 33 and 28 and connected pinions so that the contact finger 11 is in contact with the points 13—13, in which position the contact finger remains so long as the flag 2 is in lowered position, shown in broken lines in Figure 1. When the parts are so positioned the finger 11 will short circuit the ignition current from the magneto if it is attempted to start the motor without first lowering the flag so that the meter will register. It is thus impossible to start the motor until the flag has been lowered so as to bring the meter into operation. Lowering the flag is arranged to actuate the rack 8 so as to force the bevelled finger 15 of the rack beneath the contact finger 11 so as to cause it to move outwardly to the position shown in Figure 3 away from the contacts 13—13, thus opening the short circuit caused by said finger and permitting the operation of the motor. Should the operator at any time prior to the time the passenger leaves the car, raise the flag, it will permit the finger 11 to make contact between the points 13—13 by the action of the spring 11 upon the withdrawal of the rack 8, immediately short circuiting the ignition current and stopping the motor. It will thus be seen that so long as the cab is occupied by a passenger it is impossible to operate the motor and run the cab without lowering the flag so as to bring the meter into registering position. The spring 18 is the usual device for short circuiting the ignition employed in taxicabs, whereby the operator is enabled merely by touching the spring and making contact between the points 17—17 to stop the motor. During operation the spring 18 does not make contact between the points 17—17.

It will thus be seen that by the use of a meter constructed in accordance with the above specification, it becomes impossible for a dishonest driver to operate the cab with a passenger without causing the meter to register and thus requiring him to make accurate and complete report and return to his superiors, without in any way interfering with the normal operation of the cab when it is vacant.

Having thus fully described my invention, what I claim as new and desire to secure by Letters Patent is:

1. A device of the character specified, comprising in combination with a meter having a movable member for placing said meter into or out of operative setting, a motor vehicle seat and the motor ignition circuit of said vehicle, contacts in said circuit, a rod movably mounted relative to said contacts, means carried by said rod and arranged to short circuit the ignition current, tension means arranged normally to press said short circuit means toward said contacts, means actuated by the weight of an occupant on said seat for moving said rod to bring said contact means into contact with said contacts, and means actuated by the movement of said member to registering position for forcing said short circuiting means away from said contacts.

2. A device of the character specified, comprising in combination with a meter having a movable member for placing said meter into or out of operative setting, a motor vehicle seat and the motor ignition circuit of said vehicle, contacts in said circuit, a rod movably mounted relative to said contacts, a contact finger for electrically connecting said contacts to short circuit the ignition current pivotally mounted on the end of said rod, tension means arranged normally to press said finger towards said contacts, means actuated by the weight of an occupant on said seat for moving said rod to bring said finger in contact with said contacts, and means actuated by the movement of said member to registering position for forcing said finger away from said contacts.

3. A device of the character specified, comprising in combination with a meter having a movable member for placing said meter into or out of operative setting, a motor vehicle seat and the motor ignition circuit of said vehicle, contacts in said circuit, a rod movably mounted relative to said contacts, a contact finger for electrically connecting said contacts to short circuit the ignition current pivotally mounted on the end of said rod, tension means arranged normally to press said finger toward said contacts, a frame mounted in said seat, compression means for normally holding said frame in raised position, means connecting said frame with said rod whereby upon the depression of said frame by the weight of an occupant on said seat said rod is raised to bring said finger in contact with said contacts, and means actuated by the movement of said member to registering position for forcing said finger away from said contacts.

4. A device of the character specified, comprising in combination with a meter having a movable member for placing said meter into or out of operative setting, a motor vehicle seat and the motor ignition circuit of said vehicle, contacts in said circuit, a rod movably mounted relative to said contacts, a contact finger for electrically connecting said contacts to short circuit the ignition current pivotally mounted on the end of said rod, tension means arranged normally to press said finger toward said contacts, means actuated by the weight of an occupant on said seat whereby said rod is moved to bring said finger in contact with said contacts, means actuated by the movement of said member to registering position for forcing said finger away from said contacts, and a protective housing to prevent access to said parts.

FRANK H. RUEHMEIER.